United States Patent [19]

Myojo

[11] Patent Number: 4,753,398
[45] Date of Patent: Jun. 28, 1988

[54] MOUNTING LEG FOR A FISHING REEL
[75] Inventor: Seiji Myojo, Sakai, Japan
[73] Assignee: Shimano Industrial Company Limited, Osaka, Japan
[21] Appl. No.: 776,817
[22] Filed: Sep. 17, 1985
[30] Foreign Application Priority Data Nov. 2, 1984 [JP] Japan .......................... 59-167149[U]

[51] Int. Cl.⁴ ............................................. A01K 89/00
[52] U.S. Cl. .......................... 242/84.2 R; 242/84.21 R
[58] Field of Search ...................... 242/84.2 R, 84.2 F, 242/84.2 G, 84.21 R; 43/20, 22

[56] References Cited

U.S. PATENT DOCUMENTS

| 2,600,558 | 6/1952 | Mauborgne | 242/84.21 R |
| 4,163,528 | 8/1979 | Egasaki et al. | 242/84.21 R |
| 4,291,846 | 9/1981 | Carpenter | 242/84.21 R |

FOREIGN PATENT DOCUMENTS 1011658  7/1957  Fed. Rep. of Germany ..... 242/84.2 G

*Primary Examiner*—Donald Watkins
*Attorney, Agent, or Firm*—Stevens, Davis, Miller & Mosher

[57] ABSTRACT

A mounting leg is provided for mounting a fishing reel and its associated reel body on a fishing rod. The mounting leg includes an elongate leg body coupled on a first end thereof to one side of the reel body and extending upwardly from this one side of the reel body and an elongate mounting segment extending substantially longitudinally of the reel body and coupled integrally with a second end of the leg body. The leg body includes a contact portion near the second end of the leg body coupled to the mounting segment. The contact portion is adapted to contact the fingers of the angler's hand which is used to grip the fishing rod when the fishing reel is mounted thereon. The contact portion has swollen portions enlarged laterally outwardly from and in continuation of both width-wise side surfaces of the mounting segment. The contact portion, including the enlarged portions, has a width larger than a longitudinal thickness of the contact portion.

1 Claim, 2 Drawing Sheets

MOUNTING LEG FOR A FISHING REEL

FIELD OF THE INVENTION

This invention relates to a mounting leg for mounting a fishing reel and its associated reel body on a fishing rod.

BACKGROUND OF THE INVENTION

Generally, fishing reels, such as spinning reels, closed-face reels, or one-sided bearing reels, a mounting leg at the reel body. The mounting leg generally comprises an elongate leg body extending upwardly from one side of the reel body and a mounting segment which is coupled with the upper end of the leg body and extends longitudinally of, i.e., generally parallel with, the reel body. The mounting leg is adapted to mount therethrough the fishing reel on a fishing rod.

Generally, an angler, when using such fishing reel, preferably puts the leg body between the little finger and the third finger of his hand which he uses to grip the fishing rod so as to hold the rod together with the mounting segment, thereby performing casting, or winding of a fishing line onto a spool at the fishing reel.

The body of the mounting leg for conventional fishing reels is constructed to be rectangular in section and has four angular corners each chamfered with a small radius, so that when the angler puts the leg body between the fingers of his hand gripping the rod and holds it for use, large spaces exist between both widthwise side surfaces of the leg body and the angler's fingers having the leg body inserted therebetween. As a result, when his fingers which surround the leg body are attracted naturally to each other and brought into press-contact with the angular corners of the leg body, the portion of each finger which is in contact with the leg body is subjected to a locally concentrated gripping force as opposed to a distributed one, so as to significantly increase the surface pressure at the contact portion. As a result, the angler experiences pain in his finger and also is subject to becoming tired.

SUMMARY OF THE INVENTION

An object of the invenion is to provide a mounting leg for a fishing rod, which solves the problem in which an angler, when inserting the leg body between the fingers of his hand gripping the fishing rod having mounted thereon a conventional fishing reel, is free from pain in his fingers and from getting tired. The present inventor has observed that the conventional mounting leg has been designed taking into account not the relationship between the mounting leg structure and the fingers to be wrapped around the leg body, but only the strength of the mounting leg, with the resulting disadvantage that large spaces are developed between the fingers and both widthwise side surfaces of the leg body because the angler's fingers do not conform well thereto. Hence, it is an object of the present invention to provide a mounting leg which has a contact portion, which is to be in contact with the angler's fingers and is positioned at the upper end of the leg body and near the connecting portion thereof with a mounting segment, which is devised to be well fitted to the angler's fingers and not subjected to a locally concentrated gripping force therefrom, whereby the angler can hold the fishing rod without experiencing pain in his finger and without becoming tired.

In detail, the mounting leg of the invention, for mounting the fishing reel to the fishing rod, is provided with a leg body elongate and extending upwardly from one side of the reel body and a strip-like mounting segment extending longitudinally of, i.e., generally parallel with, the reel body and connected integrally with the upper end of the leg body. The mounting leg body is provided near the upper end thereof with a contact portion to be in contact with the fingers of the angler's hand gripping the fishing rod, the contact portion having swollen or enlarged portions swollen laterally outwardly from both widthwise side surfaces of the mounting segment and being in continuation thereof. Also, the contact portion including the swollen portions has a width larger than a thickness thereof in the longitudinal direction, and preferably the width is 2 to 2.5 times larger than the thickness.

When the angler puts the leg body between his fingers in order to hold the fishing rod, the swollen portions at the leg body occupy the spaces which would otherwise be present between the two fingers and the leg body, so that the angler's fingers are well fit or conformed thereto. Hence, the fingers are not subjected to a locally concentrated gripping force. As a result, he can hold the fishing rod together with the fishing reel without experiencing pain or becoming tired.

In other words, the angler, when holding the fishing rod for fishing, brings his fingers in close contact with the longitudinally front and rear surfaces of the leg body, thereby developing no space between the fingers and the front and rear surfaces.

Accordingly, the angler applies to the mounting leg a distributed gripping force not locally gathered but uniformly dispersed so as to hold the rod without experiencing pain in his fingers and becoming tired for the time he is gripping the rod and the fishing reel attached thereto.

Furthermore, the absence of a space between the mounting leg and the angler's fingers facilitates the gripping of the mounting leg together with the fishing rod.

Also, a contact area widthwise of the leg body is enlarged to provide a stable and convenient use of the reel, and the leg body can be smaller in longitudinal thickness thereof corresponding to the volume of the swollen portion, thereby further facilitating gripping by the angler.

The above and further objects and novel features of the invention will be more fully apparent from the following detailed description when read in connection with the accompanying drawings.

DETAILED DESCRIPTION OF THE INVENTION

Figure 1:
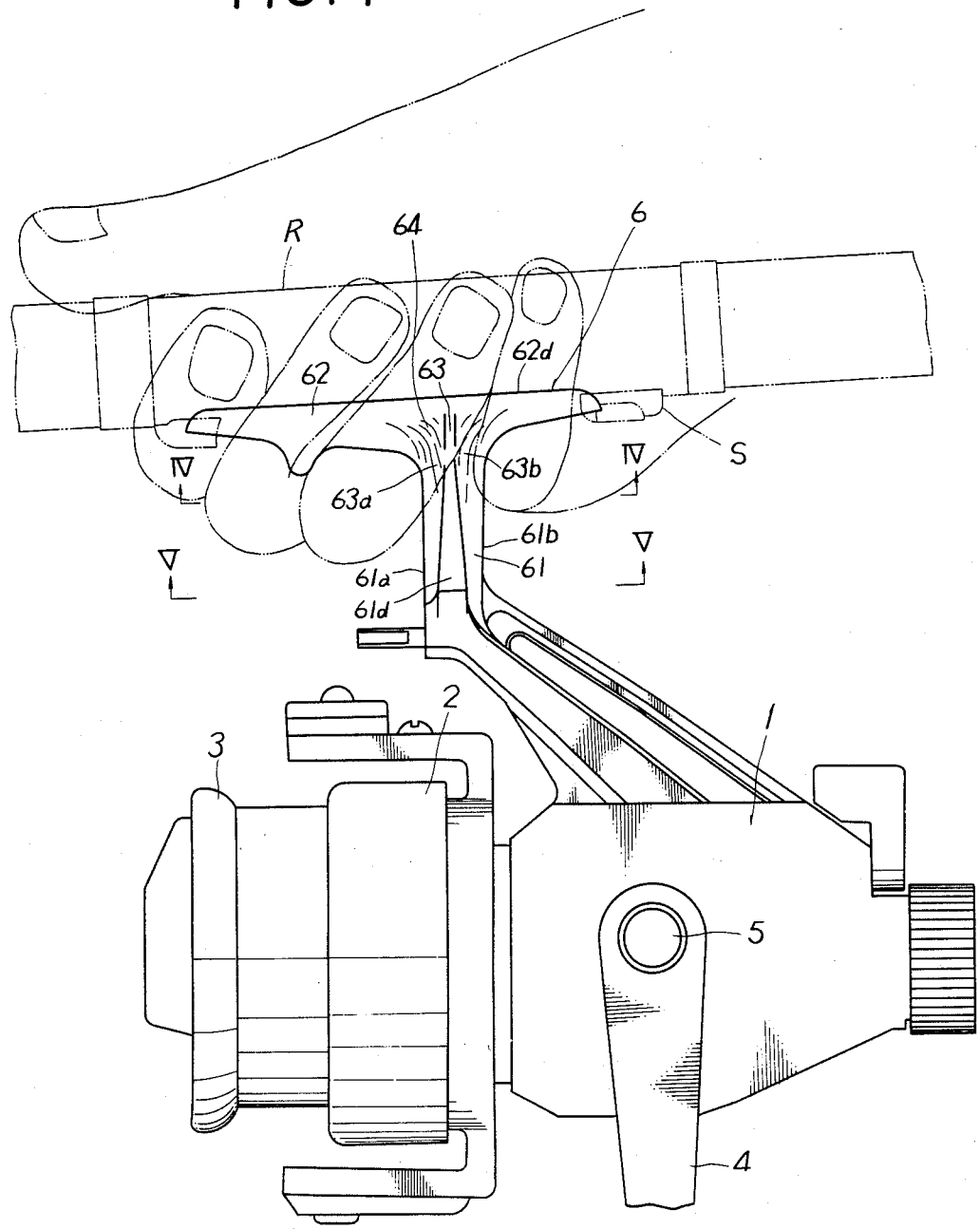
FIG. 1 is a side view of a fishing reel adopting an embodiment of a fishing reel mounting leg of the invention.
Figure 2:
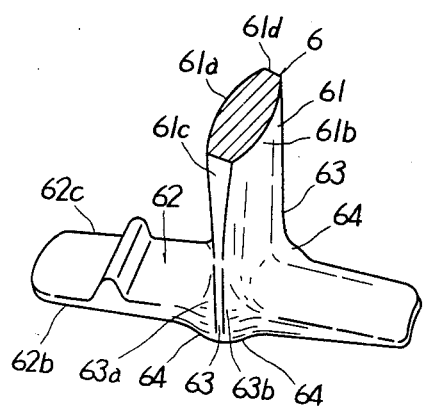
FIG. 2 is a partially perspective bottom view of the embodiment of the mounting leg of the invention.

Referring to FIG. 1, a spinning reel is shown, which, as is well-known, includes a rotary frame 2 and a spool 3 disposed in front of the front wall of a reel body 1. Rotary frame 2 is supported rotatably to the reel body 1 through a drive shaft, and spool 3 is supported longitudinally movably with respect to the reel body 1 through a spool shaft. A handle shaft 5 supporting a handle 4 is supported rotatably to a side wall of the reel body 1 and a drive mechanism (not shown) is provided between the handle shaft 5 and the drive shaft. A reciprocation mechanism (not shown) is provided between the handle shaft 5 and the spool shaft. Handle 4 is rotated to drive the rotary frame 2 and move the spool 3 in reciprocation longitudinally of the reel body 1. A mounting leg 6 to be discussed in detail below projects from the upper wall at the reel body 1.

Figure 6:
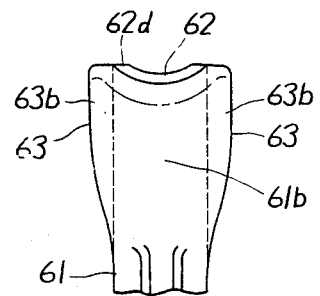
FIG. 6 is a partial side view of the mounting leg, when viewed from the right-hand side in FIG. 1.

The mounting leg 6 serves to mount the fishing reel on a fishing rod R through reel seats S and comprises an elongate leg body 61 extending upwardly from the upper wall of the reel body 1 and a strip-like mounting segment 62, which extends longitudinally of the reel body 1. Mounting segment 62 is integrally connected with the upper end portion of the leg body 61, and is widthwise curved as shown in FIG. 6.

The leg body 61, as shown in FIG. 1, extends slantwise forwardly upwardly from the upper wall of the reel body 1 and rises at its uppermost end vertically upwardly to connect with the mounting segment 62. In addition, the leg body 61 may varied to change its entire form to forms other than that illustrated in FIG. 1.

Also, the leg body 61 has in the vicinity of its upper end a contact portion adapted to be in contact with the fingers of the angler's hand gripping the fishing rod R together with the fishing reel.

Figure 5:
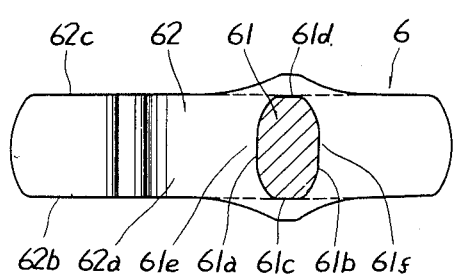
FIG. 5 is a sectional view taken on the line V—V in FIG. 1.

Also, the mounting leg 61, as shown in FIG. 5, is approximately rectangular in section at the portion thereof spaced apart from the contact portion. This rectangular section portion has a front surface 61a, a rear surface 61b and two side surfaces 61c and 61d and is not different from the conventional one. The mounting segment 62 is provided at the contact portion with swollen or enlarged portions 63 which are swollen laterally outwardly from both widthwise surfaces 62b and 62c of the mounting segment 62 and which are in continuation of both the surfaces 62b and 62c through smoothly curved surfaces 64 respectively.

Figure 4:
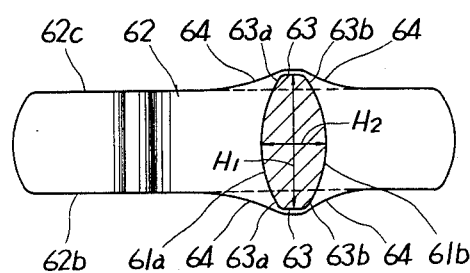
FIG. 4 is a sectional view taken on the line IV—IV in FIG. 1.

The swollen portions 63 are formed such that the side surfaces 61c and 61d at the leg body 61 in FIG. 5 extend widthwise outwardly and project from both widthwise surfaces 62b and 62c of mounting segment 62. Hence, the front and rear surfaces of each swollen portion 63 are in continuation of the front and rear surfaces 61a and 61b respectively, the swollen portions each being tapered off toward the utmost end thereof. Also, the contact portion in contact with the angler's fingers, a shown in FIG. 4, is elliptic in section.

Front surface 61a and rear surface 61b of the contact portion at the leg body 61 are curved forwardly and backwardly respectively. The front surface 63a and the rear surface 63b of each swollen portion 63 are curved in continuation of the front surface 61a and rear surface 61b at the leg body 61 respectively.

A width $H_1$ of the contact portion including the swollen portions 63 is made larger than a thickness $H_2$ of the same in the longitudinal direction, the width $H_1$ being generally 2 to 2.5 times larger than the thickness $H_2$.

The swollen portions 63 are swollen outwardly from both widthwise surfaces 62b and 62c at both lengthwise ends of the mounting segment 62 to be attached to the reel seats S.

The front surface 63a and rear surface 63b of each swollen portion are preferably curved and tapered off toward the crest thereof, although it is not necessary that they be curved.

Figure 3:
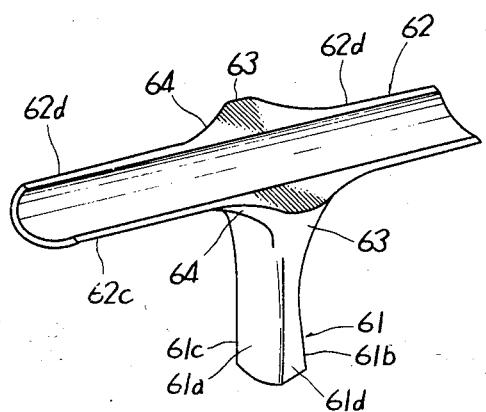
FIG. 3 is a top perspective view of the same.
Figure 7:
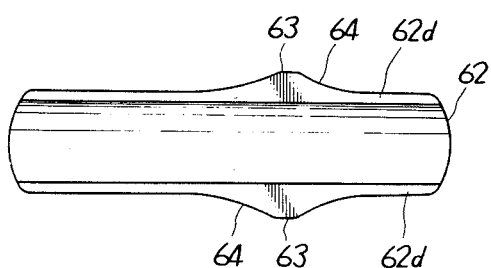
FIG. 7 is a top plan view of the mounting leg.

The end surfaces of the swollen portions 63 in continuation of the mounting segment 62, as shown in FIGS. 3 and 7, are level with the upper surface 62d of the same.

Alternatively, the swollen portions 63 may be provided at the entire leg body 61 other than merely at the contact portion. However, since the angler puts only the upper end of the leg body 61 between his fingers, swollen portions 63 need only be provided at the contact portion only.

Also, the swollen portions 63 may alternatively be separate from the leg body 61 and fixed thereto through fixing means, such as an adhesive.

The fishing reel constructed as described above is mounted at both lengthwise ends of mounting segment 62 on the reel seats S at the fishing rod R, and the angler holds the rod R together with the mounting leg 6 keeping the reel body 1 below the rod R.

In this case, the angler puts the leg body 61 between the third finger and the little finger of his hand gripping the rod R and grips the mounting segment 62 together with the rod R.

The leg body 61 has, at the contact portion adapted to be in contact with the angler's third and little fingers, the swollen portions 63 formed as described above. Moreover, since the swollen portions 63 connect with both the side surfaces 62b and 62c, when the angler bends his third and little fingers toward the palm of his hand to place between the third and little fingers the leg body 61 and grips it together with the fishing rod R, he can bring his fingers into close contact with the front surface 63a and rear surface 63b of each swollen portion 63 and also with the front surface 61a and rear surface 61b of the leg body 61, thereby preventing any space from being developed between the third and little fingers and the mounting leg 6. Hence, the angler can apply his gripping force on the mounting leg 6 so that it is not locally applied but rather uniformly distributed, so that the angler is free from experiencing pain in his fingers in contact with the mounting leg 6, thus becoming less tired and facilitating gripping of mounting leg 6 together with the rod R.

In addition, the mounting leg of the invention may be applicable to a fishing reel such as a closed-face reel or a one-sided bearing reel, and is not merely applicable to spinning reels.

While a preferred embodiment of the invention has been described using specific terms, such description is for illustrative purpose only, and it is to be understood that changes and variations may be made without departing from the spirit or scope of the following claims.

What is claimed is:

1. A mounting leg for mounting a fishing reel and its associated reel body on a fishing rod, said mounting leg comprising an elongate leg body coupled on one end thereof to one side of said reel body and extending upwardly from said one side of said reel body and an elongate mounting segment extending substantially longitudinally of said reel body and coupled integrally with another end of said leg body, said leg body comprising a contact portion near said another end of said leg body coupled to said mounting segment, said contact portion for contacting fingers of an angler's hand used to grip said fishing rod when said fishing reel is mounted thereon, said contact portion having swollen portions which are swollen laterally outwardly from and in continuation of both widthwise side surfaces of said mounting segment, said contact portion including said swollen portions having a width larger than a longitudinal thickness of said contact portion, wherein said contact portion including said swollen portions at said mounting leg body comprises a front surface and a rear surface, said front and rear surfaces being curved forwardly and rearwardly of said leg body respectively, and wherein a ratio of said width to said longitudinal thickness of said contact portion including said swollen portion is in a range of 2.0 through 2.5.

* * * * *